United States Patent [19]

Jaszczak

[11] 3,752,982

[45] Aug. 14, 1973

[54] TOMOGRAPHIC SCINTILLATION CAMERA WITH IMPROVED RESOLUTION

[75] Inventor: Ronald J. Jaszczak, Arlington Heights, Ill.

[73] Assignee: G. D. Searle & Co., Chicago, Ill.

[22] Filed: Feb. 23, 1972

[21] Appl. No.: 228,640

[52] U.S. Cl............................250/368, 250/105
[51] Int. Cl............................................... G01t 1/20
[58] Field of Search........................ 250/71.5 S, 105

[56] References Cited
UNITED STATES PATENTS
| | | | |
|---|---|---|---|
| 3,509,341 | 4/1970 | Hindel et al. | 250/71.5 S |
| 3,631,244 | 12/1971 | Bergstedt | 250/71.5 S |
| 3,633,031 | 1/1972 | Pesce et al. | 250/105 X |
| 3,684,886 | 8/1972 | Muehllegner | 250/105 X |

Primary Examiner—Archie R. Borchelt
Attorney—Lowel C. Bergstedt, Walter C. Ramm et al.

[57] ABSTRACT

An Anger-type scintillation camera employing a rotating slanted channel collimator and associated circuitry to produce a tomographic imaging capability and also employing a scanning radiation filter and associated signal filtering circuitry to improve the resolution of the tomographic imaging. Circuitry at the output of the camera corrects the detector output signal before they are processed by the signal filtering circuitry to eliminate the effect of apparent circular precession of passageways in the radiation filter caused by rotation of the collimator. After signal filtering the effect of apparent circular precession of the radiation filter passageways is reintroduced either by separate circuitry before processing by tomographic camera circuitry or by tomographic camera circuitry adapted to allow for the earlier signal correction. The system may employ the rotating collimator alone or in conjunction with a bed which precesses in a circle.

2 Claims, 3 Drawing Figures

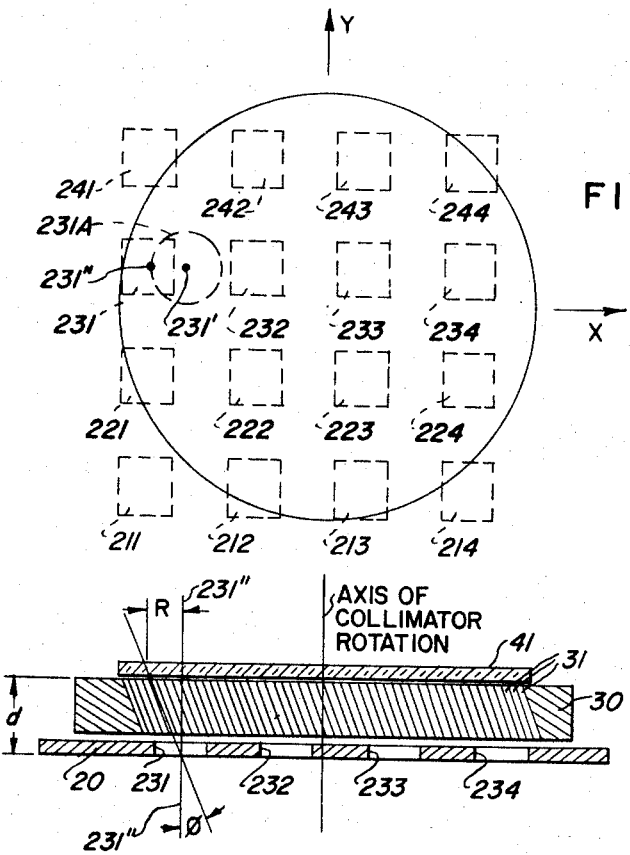
FIG. 1
FIG. 2
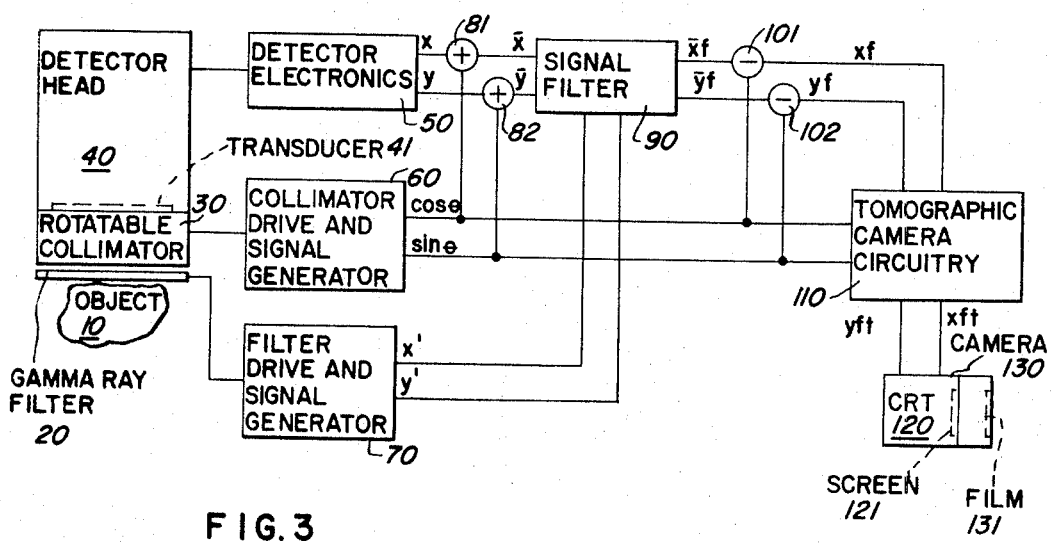
FIG. 3

TOMOGRAPHIC SCINTILLATION CAMERA WITH IMPROVED RESOLUTION

Scintillation cameras, principally Anger-type scintillation cameras (U.S. Pat. No. 3,011,057), are in widespread use in a large number of hospitals throughout the United States and foreign countries. When a scintillation camera is fitted with a rotating slanted channel collimator and appropriate circuitry in accordance with the teachings in Walker U.S. Pat. No. 3,612,865, the resulting system is capable of producing tomographic images. Circular precession of either the detector head as taught in Muehllehner patent application Ser. No. 806,449, filed Mar. 12, 1969, or the patient bed as taught in Muehllehner patent application Ser. No. 27,492, filed Apr. 13, 1970, now U.S. Pat. No. 3,684,886 produces an improved constant-sensitivity field of view for the resulting system.

These tomographic camera systems comprise an alternative approach to tomographic imaging with a scanning Anger-type detector fitted with a focussed collimator as described by Hal Anger in a University of California Lawrence Radiation Laboratory publication UCRL-16899, dated May 31, 1966, entitled "Tomographic Gamma Ray Scanner with Simultaneous Readout of Several Planes." Generally the Anger tomographic scanner provides higher resolution than the Walker or Muehllehner tomographic camera systems but the latter have greater efficiency.

It is the principal object of this invention to improve the resolution of a tomographic camera. This object is accomplished by combining the Walker or Muehllehner tomographic camera system with the approach to improving camera system resolution taught in copending Jaszczak patent application Ser. No. 200,700, filed Nov. 22, 1971. The resultant system is capable of producing tomographic images at substantially the same resolution and efficiency of the Anger tomographic scanner system, but it has the important advantage that the resulting tomographic camera system can be used with or without the resolution improving components and the user can thus select a high efficiency imaging mode with lower resolution or a high resolution mode with lower efficiency. Such mode selection is not possible with the Anger tomographic scanner system. In addition, the resulting system can be used in a non-tomographic mode, i.e. as a regular scintillation camera, with or without the resolution improving components. The result is a highly versatile system which far exceeds the capabilities of systems of the prior art.

Specific features and additional advantages of this invention will be apparent from a consideration of the following detailed description in conjunction with the accompanying drawings in which:

FIG. 1 is a schematic drawing useful in describing the operation of the invention;

FIG. 2 is a schematic section view of a portion of the mechanical components of the invention; and FIG. 3 is a block schematic diagram of an embodiment of this invention.

Referring to FIGS. 1 and 2, a scintillation crystal 41, which is a type of radiation sensitive transducer has a collimator 30 mounted in a rotatable fashion adjacent thereto. Collimator 30 has a large number of channels 31, with the axis of each channel at an angle $\phi$ to a line normal to crystal 41. Adjacent to collimator 30 is a radiation filter 20 which defines a plurality of mutually spaced passageways, e.g. 231, 232, 233, and 234, to crystal 41 for radiation quanta (e.g. gamma rays) emitted from an object (object 10 in FIG. 3) placed adjacent to filter 20. FIG. 1 shows the apparent positions of passageways in filter 20 in the plane of crystal 41 as projected through channels 31 in collimator 30. Thus central axis 231' of passageway 231 is projected onto crystal 41 as axis 231", and it can be seen that, as collimator 30 rotates, apparent axis 231" will trace out a circular path 231A. Central axes of other passageways will trace out similar circular paths.

The radius R of circular path 231A has a value equal to $d$ ctn $\phi$ where $d$ is the distance between crystal 41 and filter 20. The $x,y$ coordinates of path 231A may be defined in terms of the coordinates of axis 231' by the following equations:

$$x = X(231') - R \cos \theta,$$
$$y = Y(231') - R \sin \theta,$$

where $X(231')$, $Y(231')$ are the coordinates of axis 231' and $\theta$ is the time varying rotational coordinate of collimator 30 having $\theta = 0°$ the initial position of collimator 30 with channels 31 aligned with the x-axis as shown in FIGS. 1 and 2.

The combination of the teachings of the above referenced Walker patent or Muehllehner patent applications with the teachings of the Jaszczak copending application also referred to above, requires more than a simple, straightforward combining of respective mechanical and electrical components unless the filter plate is placed adjacent the crystal. However, experimental data shows that such a configuration results in noticably less improvement in resolution. Thus it is preferable to have the collimator between the filter plate and the transducer, and in that configuration a simple combining of respective mechanical and electrical components would not be operative. The systems in the copending Jaszczak applications which employ electrical output signal filtering circuitry require that there be no apparent motion of radiation filter passageways on the radiation transducer and hence the effect of the scanning motion of the radiation filter is removed from the detector output signals before signal filtering is accomplished. The filter scanning motion is reintroduced after signal filtering. Thus to combine a tomographic camera system with a scanning radiation filter plate system in a preferred configuration requires that the effect of apparent motion of radiation filter passageways produced by rotation of a slanted channel collimator between the radiation filter and the transducer be removed from the detector output signals before signal filtering is performed. The apparent motion must be reintroduced after signal filtering and before or during processing by tomographic camera circuitry. An overall system for accomplishing this sequence is shown in FIG. 3.

FIG. 3 shows an object 10 which contains a three dimensional distribution of a gamma ray emitting radioisotope adjacent a gamma ray filter 20 with a rotatable collimator 30 between filter 20 and transducer 41 which is mounted in detector head 40. Detector electronics 50 together with detector head 40 produces a pair of detector output signals, $x$ and $y$, which represent plane position coordinates of a quantum of radiation (e.g. a single gamma ray) interacting with transducer 41. Collimator drive and signal generator 60 produces rotation of collimator 30 and also produces a pair of collimator orientation signals, $\cos \theta$ and $\sin \theta$. Filter drive and signal generator 70 produces a raster scanning of filter 20 and also a pair of filter position signals, $x'$ and $y'$.

Summing circuits 81 and 82 correct detector output signals, $x$ and $y$, using collimator orientation signals, $\cos \theta$ and $\sin \theta$, in accordance with the following equations:

$$\bar{x} = x + R \cos \theta$$
$$\bar{y} = y + R \sin \theta$$

where $R$ and $\theta$ are as previously defined. The $\bar{x}, \bar{y}$ signals are corrected for the effect of apparent rotation of radiation passageways in filter 20.

Signal filter 90 operates on corrected detector output signals $\bar{x}, \bar{y}$ in the manner discussed in detail in the above-referenced copending Jaszczak application, the disclosure of which is specifically incorporated herein by reference. The resultant passageway identification signals are denoted $\bar{x}f$ and $\bar{y}f$.

Difference circuits 101 and 102 reintroduce the effect of apparent rotation of radiation passageways according to the following equations:

$$(xf) = (\bar{x}f) - R \cos \theta$$
$$(yf) = (\bar{y}f) - R \sin \theta$$

Tomographic camera circuitry 110 operates on signals $xf$ and $yf$ in the manner discussed in detail in either the above referenced Walker patent or the above referenced Muchllehner patent applications, the disclosures of which are specifically incorporated herein by reference. The resultant signals are denoted $xft$ and $yft$. These signals produce a dot display on screen 121 of CRT 120 in a known manner and the dot display is integrated on film 131 in Camera 130, the film serving as a documentation medium.

It should be apparent that, since the signal processing accomplished by tomographic camera circuitry 110 is an arithmetic addition or subtraction of a selectively attenuated value of collimator orientation signals, $\cos \theta$ and $\sin \theta$, difference circuitry 101 and 102 could be combined with tomographic camera circuitry 110. While FIG. 3 does not show a precessing patient bed system or precessing detector head system, it should be apparent that the addition of that feature only changes the signal processing by tomographic camera circuitry 110 in a manner which is clearly disclosed in the above referenced Muehllehner application. Other modifications could be made without departing from the scope of this invention as claimed in the following claims.

I claim:

1. In a radiation camera for imaging the volume distribution of radionuclides throughout an object under investigation, in combination:

a radiation detector, including a radiation sensitive transducer of the type producing a pair of detector output signals representing plane position coordinates of a quantum of radiation interacting with said transducer, said detector having a redetermined resolution value expressed in terms of full width at half maximum;

a collimator rotatably mounted on said detector adjacent said transducer, said collimator comprising a plurality of channels having a non-normal axial orientation with respect to said transducer;

radiation filter means interposed between said collimator and said object for defining a plurality of mutually spaced radiation passageways to said transducer for radiation quanta emitted from said object;

driving means for rotating said collimator including means for producing a pair of collimator orientation signals, said collimator rotation producing apparent circular precession of said radiation passageways with respect to said transducer;

circuit means at the output of said radiation detector for correcting said detector output signals in accordance with said collimator orientation signals to eliminate the effect of said apparent circular precession of said radiation passageways;

signal filtering means receiving said corrected detector output signals operative to produce a pair of filtered output signals corresponding to coordinates of a central axis of one of said radiation passageways traversed by a quantum of radiation interacting with said transducer;

circuit means receiving said passageway identification signals operative to translate said signals in accordance with a selectively attenuated value of said collimator orientation signals into a visual documentation on said documentation medium associated with a tomographic image of an associated plane through said object; and scanning means for producing relative scanning between said object and said radiation filter means and a corresponding synchronous relative scanning between said documentation medium and said signal filtering means such that all of said object is exposed to said transducer through said radiation passageways;

the size and separation distance of said radiation passageways being preselected in terms of said full width at half maximum resolution value of said detector to produce a desired value of resolution of the overall apparatus.

2. In a radiation camera for imaging the volume distribution of radionuclides throughout an object under investigation, in combination:

a radiation detector, including a radiation sensitive transducer of the type producing a pair of detector output signals, $x$ and $y$, representing plane position coordinates of a quantum of radiation interacting with said transducer, said detector having a predetermined resolution value expressed in terms of full width at half maximum;

a collimator rotatably mounted on said detector adjacent said transducer, said collimator comprising a multiplicity of channels with the axis of each channel at an angle $\phi$ with respect to a line normal to said transducer;

a radiation filter movably mounted adjacent said collimator at a distance $d$ from said transducer, said filter comprising a flat plate of substantially radiation opaque material having a plurality of apertures therein and having a thickness sufficient to absorb substantially all ionizing quanta emitted from said object toward said transducer except such quanta as pass through said apertures;

driving means for rotating said collimator, including means for producing a pair of collimator orientation signals, $\cos \theta$ and $\sin \theta$, where $\theta$ is the time varying rotational coordinate of said collimator;

a pair of summing circuit means receiving said detector output signals, $x$ and $y$, and said collimator orientation signals, $\cos\theta$ and $\sin\theta$, and producing a pair of corrected detector output signals, $\bar{x}$ and $\bar{y}$ according to the equations:
$\bar{x} = x + d \operatorname{ctn}\phi \cos\theta$,
$\bar{y} = y + d \operatorname{ctn}\phi \sin\theta$;

signal filtering means receiving said corrected detector output signals, $x$ and $y$, operative to produce a pair of corrected filtered output signals, $\bar{x}f$ and $\bar{y}f$, corresponding to coordinates of a central axis of one of said radiation passageways traversed by a quantum of radiation interacting with said transducer;

a pair of difference circuit means receiving said corrected, filtered output signals, $\bar{x}f$ and $\bar{y}f$, and said collimator orientation signals, $\cos\theta$ and $\sin\theta$, and producing a pair of filtered output signals, $xf$ $yf$, according to the equations:
$xf = \bar{x}f - d \operatorname{ctn}\phi \cos\theta$,
$yf = \bar{y}f - d \operatorname{ctn}\phi \sin\theta$;

tomographic circuit means receiving said filtered output signals, $xf$ and $yf$, and said collimator orientation signals, $\cos\theta$ and $\sin\theta$, and producing a pair of tomographic filtered output signals, $xft$ and $yft$, in accordance with tomographic camera principles;

display means including a cathode ray tube for displaying said tomographic filtered output signals; and scanning means for producing relative scanning between said object and said radiation filter and a corresponding synchronous relative scanning of said signal filtering means;

the size and separation distance of said apertures in said radiation filter being preselected in terms of said full width at half maximum resolution value of said detector to produce a desired value of resolution of the overall apparatus.

* * * * *